United States Patent [19]

Chung et al.

[11] Patent Number: 5,440,597
[45] Date of Patent: Aug. 8, 1995

[54] DOUBLE DWELL MAXIMUM LIKELIHOOD ACQUISITION SYSTEM WITH CONTINUOUS DECISION MAKING FOR CDMA AND DIRECT SPREAD SPECTRUM SYSTEM

[75] Inventors: Sunguoon Chung, San Diego; Stash Czaja, Cardiff, both of Calif.

[73] Assignee: Nokia Mobile Phones Ltd., Salo, Finland

[21] Appl. No.: 157,376

[22] Filed: Nov. 23, 1993

[51] Int. Cl.$^6$ .................... H04B 1/69; H04J 13/02; H04J 13/04

[52] U.S. Cl. .................... 375/200; 375/205; 375/206; 380/46

[58] Field of Search ................ 375/1; 380/46

[56] References Cited

U.S. PATENT DOCUMENTS

| | | | |
|---|---|---|---|
| 4,387,465 | 6/1983 | Becker | 375/1 |
| 4,550,414 | 10/1985 | Guinon et al. | 375/1 |
| 4,730,340 | 3/1988 | Frazier et al. | 375/1 |
| 5,081,643 | 1/1992 | Schilling | 375/1 |
| 5,103,459 | 4/1992 | Gilhousen et al. | 375/1 |
| 5,109,390 | 4/1992 | Gilhousen et al. | |

OTHER PUBLICATIONS

J. Holmes, "Acquisition Time Performance of PN Spread–Spectrum Systems", IEEE Transactions on Communications, vol. COM-25, No. 8, Aug. 1977, pp. 778–783.

D. Dicarlo, "Statistical Performance of Single Dwell Serial Synchronization Systems", IEEE Transactions on Communications, vol. COM-28, No. 8, Aug. 1980, pp. 1382–1388.

D. Dicarlo, "Multiple Dwell Serial Search: Performance and Application to Direct Sequence Code Acquisition", IEEE Transactions on Communications, vol. COM-31, No. 5, May, 1983, pp. 650–659.

A. Polydoros, "A Unified Approach to Serial Search Spread–Spectrum Code Acquisition—Part I: General Theory", IEEE Transactions On Communications, vol. COM-32, No. 5, May, 1984, pp. 542–549.

Primary Examiner—David C. Cain
Attorney, Agent, or Firm—Perman & Green

[57] ABSTRACT

A double dwell, maximum likelihood, serial sliding acquisition system (10) employs two thresholds which are a function of maximum likelihood thresholds, and not predetermined optimal thresholds. The two thresholds have values that are signal dependent, and are obtained in real time from a correlation of a received PN signal and a locally generated PN sequence during the acquisition process. The acquisition system continuously monitors the reliability of the detected signal. As a result, the decision making process is continuously performed so as to terminate the acquisition process whenever the detected signal is determined to be reliable. The acquisition system employs a principle that an optimal threshold level, in the power domain, is 6 dB lower than that of the maximum likelihood signal. The acquisition system obtains the maximum signal power from a maximum likelihood detector portion to adaptively update a threshold estimate, and then uses the adaptive threshold estimate for monitoring the reliability of the detected signal. After the reliable signal is detected the search process continues for an additional interval of time which is a function of a false alarm probability. The limited interval for which the search process continues is preferably a fraction or multiple of the second, longer dwell time. This additional searching interval is referred to as a post-detection search interval. During the post-detection search interval, the acquisition system monitors the received signal samples and, when no additional signal is detected, the acquisition process is terminated.

14 Claims, 4 Drawing Sheets

FIG. 1 PARALLEL MAXIMUM LIKELIHOOD ACQUISITION SYSTEM
Prior Art
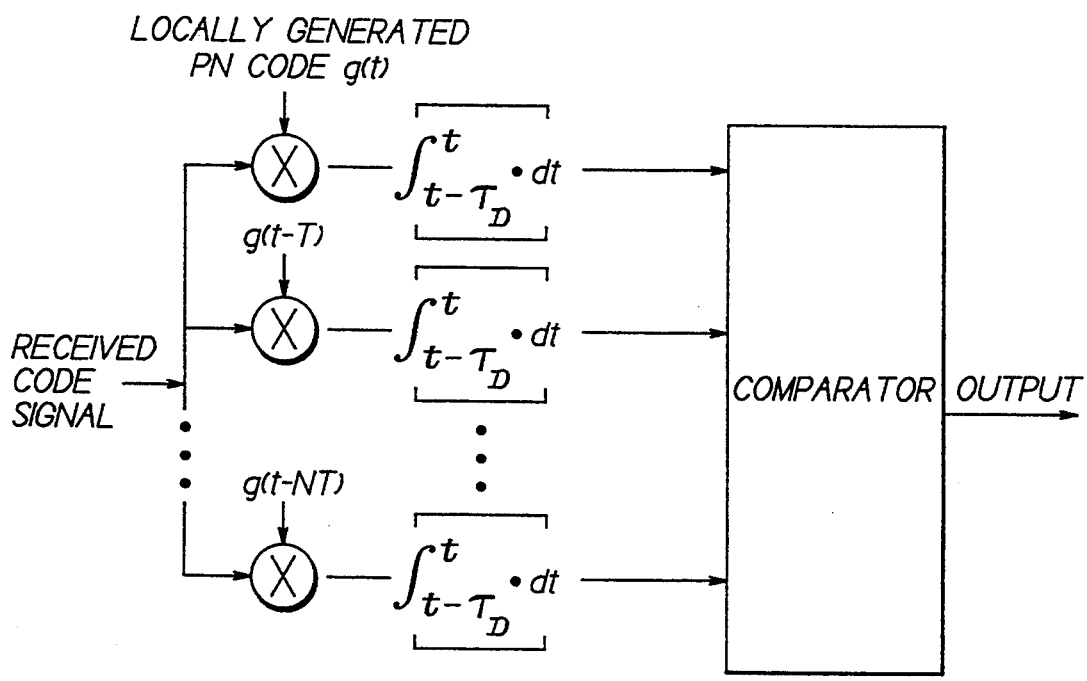
FIG. 2 A SERIAL REALIZATION OF THE MAXIMUM LIKELIHOOD ACQUISITION SYSTEM
Prior Art
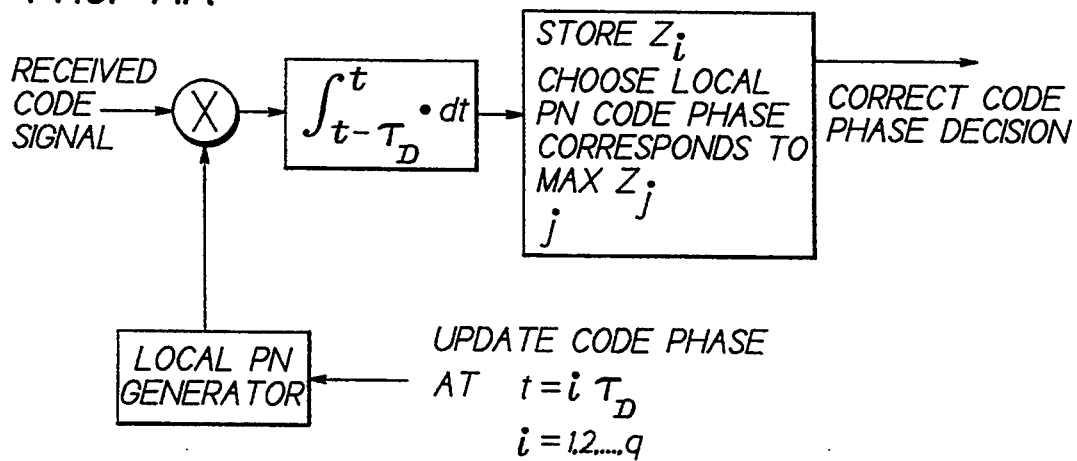

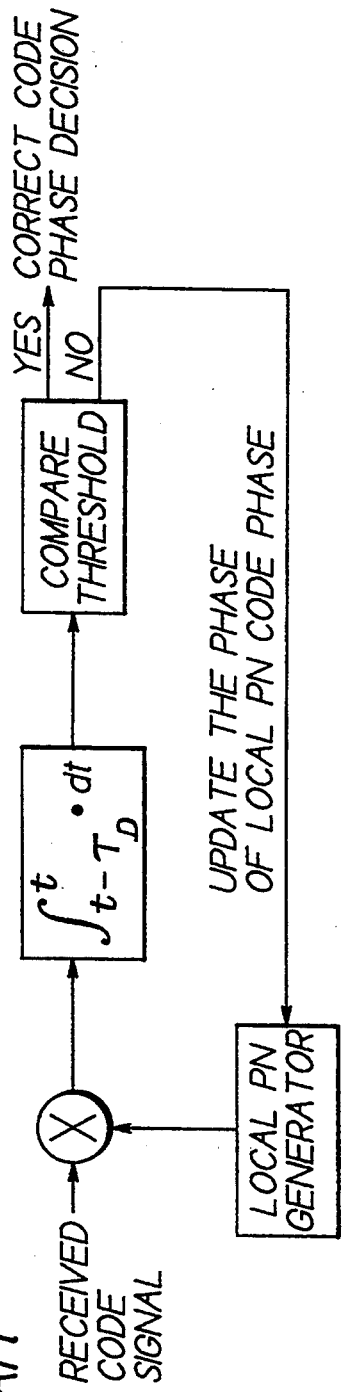
FIG. 3 DS SINGLE DWELL SERIAL SLIDING ACQUISITION SYSTEM
Prior Art
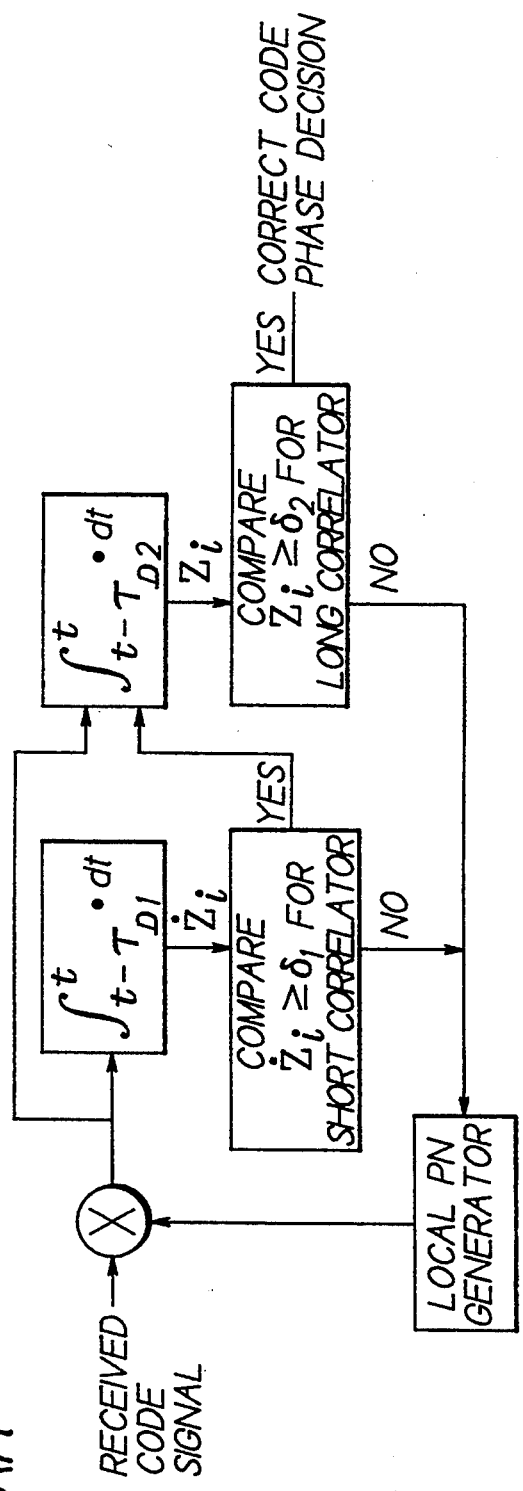
FIG. 4 DS DOUBLE DWELL SERIAL SLIDING ACQUISITION SYSTEM
Prior Art

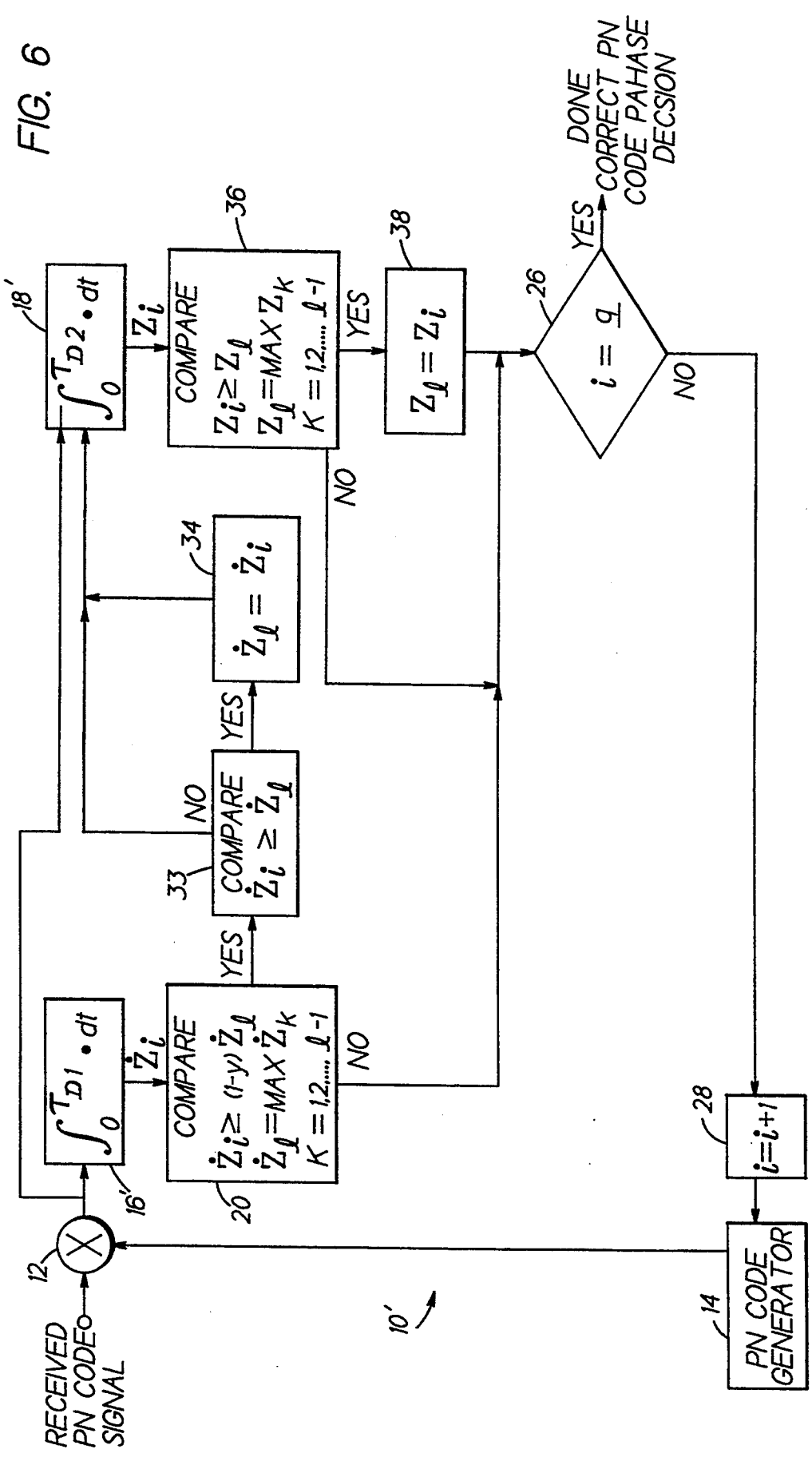

DOUBLE DWELL MAXIMUM LIKELIHOOD ACQUISITION SYSTEM WITH CONTINUOUS DECISION MAKING FOR CDMA AND DIRECT SPREAD SPECTRUM SYSTEM

FIELD OF THE INVENTION

This invention relates generally to wireless communication systems and, in particular, to radiotelephones that operate in accordance with spread spectrum techniques.

BACKGROUND OF THE INVENTION

A direct-sequence or direct sequence coding spread spectrum communication technique in essence combines two digital signals, or bit streams, to create a third signal prior to transmission. The first signal is an information signal, such as the output of a digitized voice circuit. For example, the first signal may have a bit rate of 10 kb/s. The second signal is generated by a random-sequence, or pseudonoise (PN) generator, and is a stream of essentially random bits having a bit rate that is several orders of magnitude greater than the bit rate of the digitized voice signal. The modulation of these two signals results in the third signal having the same bit rate as the second signal. However, the third signal also contains the digitized voice signal. At the receiver, an identical random-sequence generator produces a random bit stream which mirrors the original random-sequence that was used for modulation at the transmitter. For proper operation, after carrier frequency demodulation, the PN generator of the receiver must be synchronized to the incoming PN sequence. By removing the random sequence from the received signal and integrating it over a symbol period, a despread signal is obtained. Ideally, the despread signal exactly represents the original 10 kb/s voice signal.

A primary function of synchronization in such a spread spectrum communication system is to despread the received pseudonoise (PN) code for demodulation of the received signal. This is accomplished by generating a local replica of the PN code in the receiver, and then synchronizing the local PN signal to the PN signal which is superimposed on the incoming received signal. The process of synchronization is conventionally accomplished in two steps. The first step, referred to as acquisition, brings the two spreading signals into alignment with one another. The second step, referred to as tracking, subsequently and continuously maintains the best possible waveform alignment by means of a feedback loop. Of primary interest herein is the acquisition step of the synchronization process.

Because of the importance of synchronization (or acquisition), many techniques have been proposed which utilize various types of detectors and decision strategies. One common feature of all conventional synchronization techniques that are known to the inventors is that the received signal and the locally generated signal are first correlated to produce a measure of similarity between the two signals. Next, the measure of similarity is compared to a predetermined threshold value to determine if the two signals are in synchronism. If synchronization is detected, then the closed loop tracking system is activated to maintain synchronization. If synchronization is not detected, the acquisition procedure changes a phase of the locally generated PN code and another correlation is attempted as the system searches through the PN phase space.

There are two dwell time (or integration interval) schemes used for correlation: a fixed dwell time and a variable dwell time.

The fixed dwell time approach is relatively simple to implement and analyze and, as a result, finds wide spread use. The fixed dwell time technique can be implemented in one of two ways: as a single dwell time and as a multiple dwell time.

One of the least complex acquisition techniques employs a maximum likelihood approach with a single dwell time. This technique requires that the received PN code signal be correlated with all possible code positions of the local PN code replica. The correlations are performed in parallel, as illustrated in FIG. 1, and the corresponding detector outputs all pertain to the identical observation of the received signal (plus noise). The correct PN alignment is chosen by a comparator for a local PN code phase position which produces the maximum output from the detector. The acquisition can be accomplished rapidly because all possible code offsets are examined simultaneously. However, for long PN codes with a large processing gain, such as those required in spread spectrum systems, the complexity of the parallel implementation is often prohibitive.

The maximum likelihood approach can also be implemented in a serial fashion as illustrated in FIG. 2. Here the received input PN signal is serially correlated with all possible code positions of the local PN code replica and the corresponding correlations are compared with the maximum correlation value obtained from the correlator corresponding to the previous phase of the PN code. At the end of the procedure, the correct PN alignment is chosen so that the local PN code phase position produces the maximum detector (or correlator) output. The maximum likelihood approach uses the maximum detected output over an entire PN space to choose the correct phase of the locally generated PN code for PN alignment. This yields better detection performance by at least 6 dB signal to noise ratio (SNR), in comparison to those systems which utilize the optimal threshold for detection in noisy environments. However, a decision cannot be made until the entire PN code period has been searched. As a result, for long codes with large processing gain, such as those required in Code Division Multiple Access (CDMA) spread spectrum systems, the time to search the entire PN code space before reaching a decision is often prohibitive.

One known synchronization approach that is used in spread spectrum communication systems is referred to as a serial sliding acquisition algorithm. This approach uses a single correlator to serially search for the correct phase of a direct sequence (DS) code signal. More specifically, the serial search is performed by linearly varying the time difference between the PN modulation on the received incoming PN code and the locally generated PN code. A continuous decision process determines when synchronization is achieved. Such a system is also referred to in the literature as a single dwell sliding acquisition system, an example of which is illustrated in FIG. 3.

In that the test for synchronization is based on the crossing of a threshold by the output of the detector, when compared with the serial maximum likelihood acquisition approach discussed above (FIG. 2), the single dwell sliding acquisition system trades off a shorter acquisition time against a reduced accuracy in the detection of synchronization.

In response to this shortcoming an improved version of the single dwell sliding acquisition system was developed to employ multiple correlators (or integration period dwell times). The advantage of the multiple dwell acquisition system is that the examination interval need not be fixed, allowing an incorrect PN phase to be quickly discarded. This results in a shorter search time than is possible using a fixed, single dwell time approach. This type of searching (acquisition) technique is particularly useful for DS code acquisition in a spread spectrum communication system with a large processing gain. The most popular multiple dwell acquisition system is a double dwell acquisition system of a type illustrated in FIG. 4.

The system of FIG. 4 has two integration periods (or dwell times). The first (shorter) dwell time is used to discard incorrect cells quickly and search the correct phase candidate with a rough detection probability, and the second (longer) dwell time is used to provide an improved estimate of whether the in-synch PN code phase has been found. The basic approach thus apportions some false alarm protection in the first integration, and places the remaining (usually greater) false alarm protection in the second integration. In general, the use of the double dwell search approach reduces acquisition time significantly.

The serial sliding search algorithm, whether implemented as a single dwell search (FIG. 3) or as a multiple dwell search (FIG. 4), uses a single threshold (with the single dwell search) or multiple thresholds (with the multiple dwell search) for the determination of the correct PN phase. The best acquisition performance of the serial sliding acquisition system is obtained by using an optimal threshold, or thresholds in the case of a multiple dwell system.

However, in a practical communication environment the optimal threshold is not related to a fixed value, but is instead a function of the signal to noise ratio (SNR). As is well known, and for a communication environment where mobility of the receiver is expected, the SNR of a communication channel will vary as a function of time and as a function of the velocity and location of the receiver.

The optimal threshold level, used to distinguish the signal from the noise level, is always 3 dB lower than the maximum likelihood signal level which is used as the threshold by the maximum likelihood acquisition system. Thus, a single dwell serial acquisition algorithm yields, at best, a detection performance that is 6 dB less than the performance of the maximum likelihood acquisition system.

As a result, in a noisy communication environment the maximum likelihood acquisition system exhibits better acquisition performance by at least 6 dB (in SNR), as compared to the performance of the serial sliding acquisition systems which utilize an optimal threshold for signal detection. However, in the previously described maximum likelihood acquisition system (FIG. 2), a decision cannot be made until the entire code period has been searched. As was noted above, for long PN codes the time to search the entire code space before reaching a decision can be prohibitive.

SUMMARY OF THE INVENTION

The foregoing and other problems are overcome and the objects of the invention are realized by an improved acquisition system which exhibits all of the advantages of the maximum likelihood acquisition system, as well as all of the advantages of the serial sliding acquisition system, without exhibiting the disadvantages that are inherent in each.

An acquisition system that is constructed and operated in accordance with this invention employs a double dwell, maximum likelihood, serial sliding acquisition structure to achieve an improved detection probability and reduction of the false alarm probability, while also performing a continuous decision making process to determine if synchronization is achieved. This is a significant improvement over the double dwell, serial sliding acquisition system of FIG. 4, which employs predetermined acquisition thresholds.

In a manner similar to that found in the double dwell serial sliding system of FIG. 4, the acquisition system of this invention has two integration intervals. The first integration interval is employed to rapidly search the code phases, while the second integration interval provides an improved estimate of the detector output.

In accordance with an aspect of this invention, and unlike the double dwell serial sliding acquisition system, the improved acquisition system employs two thresholds which are a function of maximum likelihood thresholds, and are not predetermined optimal thresholds. The two thresholds have values that are signal dependent, and are obtained in real time from a correlation of the received signal and the locally generated PN sequence during the acquisition process. In addition, the thresholds are always at the maximum signal level during the correlation. These thresholds and their corresponding optimal thresholds are used to detect a reliable signal and to determine when to terminate the acquisition process. This is in contradistinction to the thresholds of the maximum likelihood acquisition system, whether implemented in a single dwell or in a multiple dwell fashion, which is incapable of making a decision until the entire code period has been searched.

The double dwell, maximum likelihood, serial sliding acquisition system of this invention continuously monitors the reliability of the detected signal. As a result, the decision making process is continuously performed so as to terminate the acquisition process whenever the detected signal is determined to be reliable. Additionally, there is no requirement to search for a "best" transmitter, or base station cell, to establish communication. Instead, the only requirement is that a base station be detected that is transmitting with a reliable signal.

The improved acquisition system employs the principle that the optimal threshold level, in the power domain, is 6 dB lower than that of the maximum likelihood signal. The improved acquisition system obtains the maximum signal power from a maximum likelihood detector portion to update a threshold, then uses a corresponding optimal threshold estimate for monitoring the reliability of the detected signal.

In a presently preferred embodiment of this invention, after the reliable signal is detected the search process continues for an additional interval of time which is a function of the false alarm probability. The limited interval for which the search process continues is preferably a fraction or multiple of the second, longer dwell time. This additional searching interval is referred to herein as a post-detection search interval. During the post-detection search interval, the acquisition system monitors the received signal samples and, when no additional signal is detected, the acquisition process is terminated.

As a result, and unlike the conventional maximum likelihood acquisition system, the improved acquisition system of this invention is not required to search the entire PN code space to make a decision. This reduces the acquisition time significantly. Also, and unlike the conventional serial sliding acquisition system, the improved acquisition system of this invention automatically determines an optimal threshold after obtaining a reliable signal level, thereby avoiding the use of a predetermined threshold value.

In summary, because the maximum likelihood threshold is employed, the reliability and performance of the improved acquisition system, in a noisy environment, is improved by at least 6 dB over that of the conventional double dwell serial sliding acquisition system of FIG. 4. The improved acquisition system also reduces the acquisition time significantly from that of the serial maximum likelihood acquisition system (FIG. 2) by employing a continuous decision making process to terminate the search after the system obtains a reliable signal.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 illustrates a parallel maximum likelihood acquisition system of the prior art;

FIG. 2 illustrates a prior art serial implementation of the maximum likelihood acquisition system;

FIG. 3 illustrates a prior art direct sequence (DS) single dwell serial sliding acquisition system;

FIG. 4 illustrates a prior art DS double dwell serial sliding acquisition system;

FIG. 6 is a block diagram that illustrates an embodiment of a double dwell maximum likelihood decision searcher system.

DETAILED DESCRIPTION OF THE INVENTION

Figure 5:
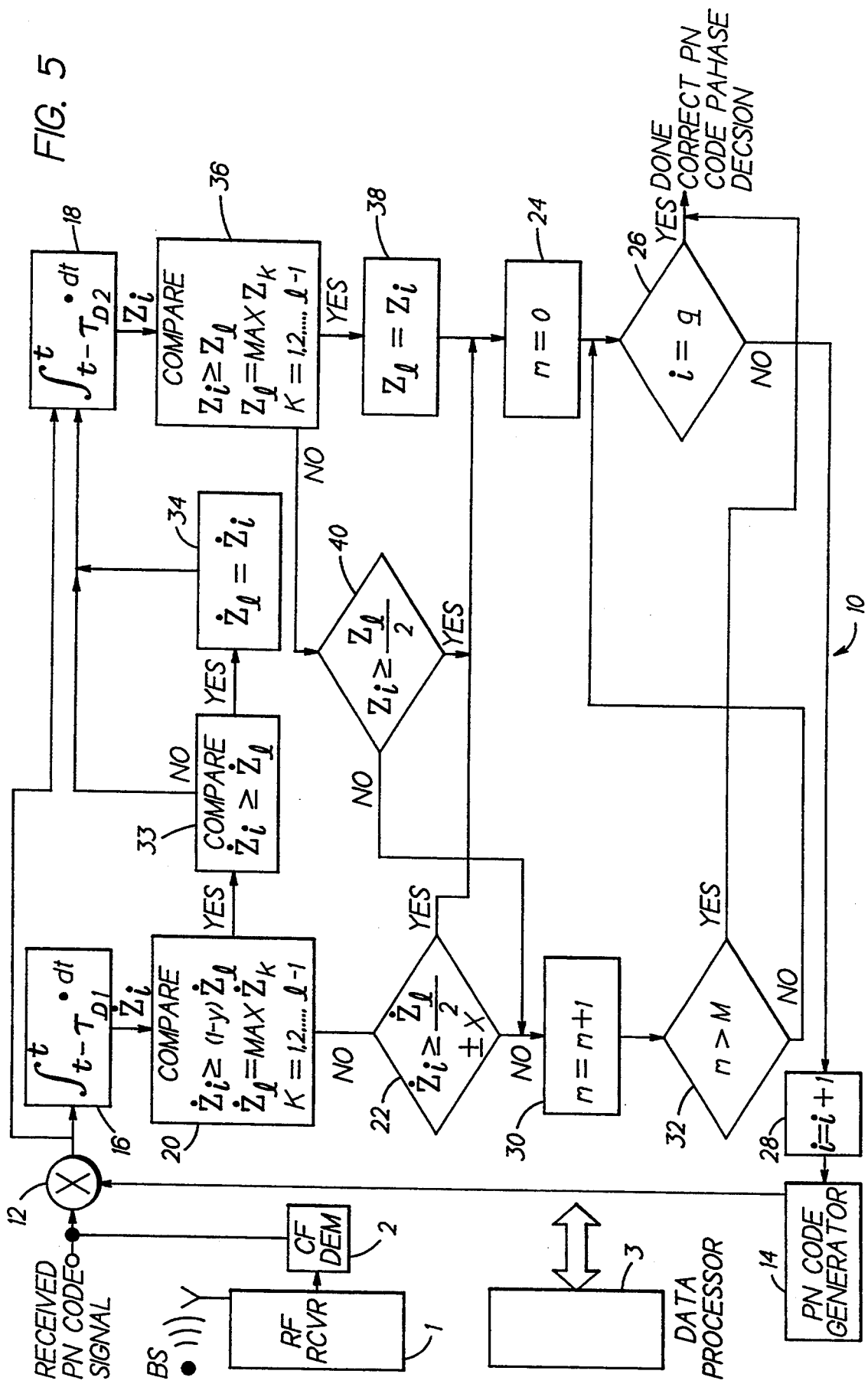
FIG. 5 is a block diagram that illustrates an embodiment of a double dwell maximum likelihood decision acquisition system having a continuous decision making capability and a post-detection search interval.

Reference is made to FIG. 5 which illustrates a presently preferred embodiment of a double dwell, maximum likelihood, serial sliding acquisition (DDMLSSA) system 10 in accordance with this invention. The DDMLSSA system 10 may be implemented with discrete circuit elements, or as software routines that are executed by a suitable digital data processor, such as a high speed signal processor. Alternatively, a combination of circuit elements and software routines can be employed. As such, the ensuing description is not intended to limit the application of this invention to any one particular technical embodiment.

The DDMLSSA system 10 may be a part of a receiver of a telecommunications device, such as a CDMA radiotelephone that operates in accordance with the TIA/EIA Interim Standard, Mobile Station-Base Station Compatability Standard for Dual-Mode Wideband Spread Spectrum Cellular System, TIA/EIA/IS-95 (July 1993). When the radiotelephone is energized, one or more pilot channels are received from a neighboring base station or base stations. Each pilot channel conveys a PN code sequence that differs in phase (e.g., that is offset in GPS time) from the PN code sequences of the pilot channels of other base stations within the system. One function of the DDMLSSA system 10 is to synchronize the local PN generator of the receiver to the PN sequence of a pilot channel that has a signal strength that exceeds the noise level by an acceptable increment. It is noted that the DDMLSSA system 10 of this invention is not required to initially synchronize to a pilot channel of a base station that is nearest to the receiver, but is required only to synchronize to a pilot channel that has a sufficient signal strength to initiate communications between the receiver and the base station.

More particularly, the DDMLSSA system 10 operates in conjunction with an RF receiver 1 and carrier frequency demodulator (CF DEM) 2 to receive a PN code signal from the pilot channels of one or more transmitting base stations (BS). The DDMLSSA system 10 is also connected during use to a controller, such as a data processor 3, from which integration times and certain thresholds may be loaded. The data processor 3 is also capable of reading out values from the DDMLSSA system 10, such as the phase of the PN code that results in an optimum correlation with the received PNcode signal. The adaptively obtained thresholds may also be read out by the data processor 3.

A received PN code signal (plus noise) is applied to a multiplier 12 where it is multiplied by a PN code that is output from a local (in the radiotelephone) PN generator 14. The output of the multiplier 12 is applied to a first integrator 16 and to a second integrator 18. The first integrator 16 is a "trial" integrator having an integration period of $\tau_{D1}$ seconds. The output of the integrator 16 is applied to a comparison block 20. If the output ($^*z_i$) of the integrator 16 at time t is less than a threshold $((1-y)^*z_1)$, where y is between 1/16 and ⅛, the acquisition system 10 compares in block 22 the output of the first integrator 16 with an adaptively determined threshold estimate ($^*z_1/2$), which is less than the historical value of the output of the first integrator 16. Preferably, the adaptively determined threshold is 6 dB lower than the maximum signal energy or maximum likelihood threshold ($^*z_1/2$), plus or minus (x). In the preferred embodiment of the invention the value of x may vary from zero to approximately 3 dB.

The threshold in block 20 is a function of the maximum integrator 16 output obtained from past history till t−1, and is established to provide more than a 50% confidence interval for the relatively short correlation length.

If the first integrator 16 output is equal to or exceeds the adaptively determined threshold estimate at block 22, the system initializes, or resets, in block 24, a noise sample counter index m to zero. The phase i of the locally generated code signal is then compared at block 26 to q to determine if the end of the PN code space has been reached. If not, the phase i is changed in block 28 by a required chip resolution period (or interval), the PN code generator 14 is updated, and the correlation is reexamined.

If the phase i=q at block 26, the acquisition process is terminated, in that an exhaustive search has been made of the PN code space, and a correct PN code phase decision has been made. It is noted that q is the size of cells (or PN phases) to be searched in PN space and can be a total number of PN chips, or a multiple number of PN chips, in the code space, depending upon the chip resolution required. In the presently preferred embodiment of this invention q is the total number of PN chips in the code space, and has a value of $2^{15}$ (32,768).

If the output of the first integrator 16 is less than the adaptively determined threshold estimate in block 22, the noise sample counter index m is incremented by one in block 30, then compared in block 32 with a threshold M. If the noise sample index m exceeds the threshold M, the acquisition system terminates the search process, in that the correct PN code phase decision has been made. This occurs after the acquisition system 10 evaluates a predetermined number of noise samples (or uncorrelated signals) after obtaining a reliable signal. This provides the above-mentioned post-detection search interval. As an example, a suitable value for M is in the range of approximately 70 to approximately 150, and is selected to provide a detection probability that exceeds, for example, 99%.

If the noise sample index m does not exceed the threshold M at block 32, then the phase of the locally generated PN code signal is incremented by the required chip resolution period (or interval) in block 28 and the correlation is reexamined. The process continues in this manner until a hit occurs, i.e. the first threshold (block 20) is exceeded for the relatively short correlation interval represented by the first integrator 16, or until the desired number (M) of noise samples has been examined.

When a hit occurs the output of integrator 16 is compared against $^*z_1$ at block 33. If the output of integrator 16 is equal to or greater than $^*z_1$, the first threshold is updated (or replaced) with the current output of the integrator 16 in block 34. Then, without changing the PN code phase (block 28 is not executed), the integration (dwell) time is increased to $\tau_{D2}$ seconds. The second dwell time provides both a higher probability of detection and a lower probability of false alarms. If the output of integrator 16 is less than at $^*z_1$ block 33, the first threshold is not updated before performing the second integration at block 18.

In the presently preferred embodiment of the invention the integration time of integrator 16 is equivalent to approximately 64 chips to approximately 256 chips, with 64 chips (52 microseconds) being a presently preferred value. The integration time of integrator 18 is equivalent to approximately 128 chips to approximately 2048 chips, with 128 chips (104 microseconds) being a presently preferred value. The integration time of the integrator 18 is selected to exceed the integration time of the integrator 16.

A comparison is made in block 36 to determine if a second threshold ($Z_i$) is exceeded. If it is, the second threshold ($Z_i$) is updated (or replaced) in block 38 with the current output ($Z_i$) of the second integrator 18. The noise sample index m is initialized to zero in block 24, the phase of the locally generated code signal is changed by a fraction of a chip in block 28, and the correlation is reexamined.

If $Z_i$ is less than the second threshold in block 36, the acquisition system 10 compares in block 40 the current output ($Z_i$) of the integrator 18 with a second adaptively determined threshold estimate ($Z_l/2$), which is 6 dB lower than the maximum signal energy level. If the current output of the integrator 18 is equal to or greater than the second adaptively determined threshold estimate ($Z_l/2$), the acquisition system 10 resets the noise sample counter index m to zero in block 24, the phase of the locally generated PN code signal is changed by a fraction of a chip in block 28, and the correlation is reexamined.

If the signal energy (i.e., the output of the integrator 18) is less than the second adaptively determined threshold estimate in block 40, the noise sample counter index m is incremented by one at block 30, and is then compared with the threshold M in block 32. If the noise sample index m exceeds the threshold M, the acquisition system 10 terminates the acquisition process. As before, the termination indicates that the acquisition system 10 has evaluated the predetermined number (M) of the noise samples (or uncorrelated signals) after it first obtained a reliable signal. If the noise sample counter index m does not exceed the threshold M, the search continues as previously described. That is, the phase i of the locally generated PN code signal is changed by a fraction of a chip (block 28), and the correlation is reexamined.

In a noisy communication environment, and when the acquisition process begins, the output of the integrator 16 fluctuates rapidly and, as a result, the second integrator 18 is frequently used. However, as the acquisition process proceeds the first integrator 16 increasingly discards incorrect PN phases. The system 10 therefore uses the second integrator 18 less frequently. In that the second integrator 18 has the longer dwell time, this results in a reduction in the acquisition time.

Furthermore, when the system 10 is first activated the thresholds $^*z_l$ and ($Z_l$) are both reset to zero. As a result, the first comparison at block 20 results in the Yes path being taken to block 33, and the Yes path from block 33 being taken to block 34 where the threshold $^*z_l$ is initialized to the value of $^*z_i$. The second integrator 18 is then employed, and the result of the comparison at block 36 results in the Yes path being taken to block 38, where the second threshold $Z_l$ is initialized to $Z_i$. At block 24 the noise index counter m is initialized to zero, and the next PN code phase is set at block 28. As a result, after the first PN code of the PN code space is sampled the system 10 has automatically initialized itself.

In accordance with the foregoing description it can be seen that the received input PN signal is serially correlated with all possible code positions of the local PN code replica, and the corresponding threshold values and the maximum detector output are updated whenever the detector output exceeds the threshold value. This continues until the correlated output satisfies the condition to terminate the acquisition process. After the acquisition process is terminated, the correct PN alignment is chosen as the local PN code phase position which produced the maximum detector output.

The acquisition system 10 exhibits all of the advantages of the maximum likelihood acquisition system, as well as all of the advantages of the serial sliding acquisition system, without exhibiting the disadvantages that are inherent in each.

More particularly, advantages of the acquisition system 10 over the conventional serial sliding acquisition system include the following. First, the acquisition system 10 inherently obtains a reliable signal level. Second, the acquisition system 10 achieves an improved acquisition performance by at least 6 dB over that of the conventional optimal threshold acquisition systems. Third, the acquisition system 10 determines thresholds automatically and in real-time, in a given communication environment, without requiring the use of a predetermined optimal threshold.

Advantages of the acquisition system 10 over the conventional maximum likelihood acquisition system include the following. First, the acquisition system 10 terminates the acquisition process after obtaining a reliable signal, without requiring the entire PN space to be searched. Second, the acquisition system 10 further reduces the acquisition time over that required in the conventional maximum likelihood system.

The use of two integration intervals within a given cell examination period is beneficial at least for the reason that an incorrect alignment is dismissed earlier than would be possible in a single dwell acquisition system. As will be remembered, the single dwell acquisition system is constrained to integrate over the full examination interval. In that most of the cells that are searched correspond to incorrect alignments, the ability to quickly eliminate these cells produces a considerable reduction in acquisition time, particularly for long PN codes.

In general, by using thresholds (6 dB and 9 dB), which are a function of penalty time and system parameters, an optimal tradeoff is obtained between acquisition time and reliability (rejection of false alarms).

Reference is now made to FIG. 6 which illustrates a second embodiment of this invention. A double dwell, maximum likelihood acquisition (DDMLA) system 10' is constructed as a subset of the system 10 of FIG. 5, and blocks that function in the same manner as the blocks of FIG. 5 are numbered accordingly. The first integrator 16' integrates the received PN code signal, after multiplication by the locally generated PN code, over a period from zero to $\tau_{D1}$, while the second integrator 18' integrates over the longer period from zero to $\tau_{D2}$.

The output of the integrator 16' is applied to the comparison block 20. As in the embodiment of FIG. 5, the threshold in block 20 is a function of the maximum integrator 16' output obtained from past history till $t-1$, and is established to provide more than 50% confidence interval for the relatively short correlation length. If the output ($*z_i$) of the integrator 16' at time t is less than the threshold $((1-y)*z_l)$, where y is between 1/16 and ⅛, the phase i of the locally generated code signal is changed in block 28 by the required chip resolution period (or interval), the PN code generator 14 is updated, and the correlation is reexamined. The process continues in this manner until a hit occurs, i.e. the first threshold (block 20) is exceeded for the relatively short correlation interval represented by the first integrator 16'.

When a hit occurs the output of integrator 16' is compared against $*z_l$ at block 33. If the output of integrator 16' is equal to or greater than $*z$, the first threshold is updated (or replaced) with the current output of the integrator 16' in block 34. Then, without changing the PN code phase (block 28 is not executed), the integration (dwell) time is increased to $\tau_{D2}$ seconds and the integrator 18' processes the input signal. The second dwell time provides both a higher probability of detection and a lower probability of false alarms. If the output of integrator 16' is less than $*z_l$ at block 33, the first threshold is not updated before performing the second integration at block 18'.

As before, for this embodiment of the invention the integration time of integrator 16' is equivalent to approximately 64 chips to approximately 256 chips, with 64 chips (52 microseconds) being a presently preferred value. The integration time of integrator 18' is equivalent to approximately 128 chips to approximately 2048 chips, with 128 chips (104 microseconds) being a presently preferred value. The integration time of the integrator 18' is selected to exceed the integration time of the integrator 16'.

A comparison is made in block 36 to determine if the second threshold ($Z_l$) is met or exceeded. If it is, the second threshold ($Z_l$) is updated in block 38 with the current output ($Z_i$) of the second integrator 18 and the current PN phase is compared to the maximum PN phase at block 26. If i=q, indicating that the entire PN code space has been examined, the operation of the system 10' terminates. At this time (the end of the exhaustive search of the PN code space) the PN code having the greatest energy has been determined. If i does not equal q at block 26 the search continues as previously described. That is, the phase i of the locally generated PN code signal is changed by a fraction of a chip (block 28), and the correlation is reexamined.

The system 10' of FIG. 6 is particularly well adapted for use during a multipath (post-acquisition) search phase, in that a processing time improvement (due to the shorter integration period of the integrator 16') is obtained over the correlators of the prior art. For example, the system 10' can be employed to perform an exhaustive search over a subset or window of PN codes (e.g., plus and minus 32 PN codes) about a predetermined PN code of interest.

Although this invention has been described in the context of a double dwell acquisition system, it should be realized that the teaching of this invention can be extended to an n-dwell acquisition system (wherein n>2), and will reduce the acquisition time and improve the performance.

Thus, while the invention has been particularly shown and described with respect to presently preferred embodiments thereof, it will be understood by those skilled in the art that changes in form and details may be made therein without departing from the scope and spirit of the invention. For example, the integrators 16 and 18 (or 16' and 18') may be a single integrator that is suitably reprogrammed to have two different integration periods.

What is claimed is:

1. A method of searching a pseudorandom noise (PN) code space, comprising the steps of:

(a) combining a received PN code signal with a first local PN code signal to obtain an input signal;

(b) integrating the signal energy of the input signal over a first predetermined time interval to obtain a first result;

(c) comparing the first result to a first threshold having a value that is a function of a previous first result; if the first result is determined to be less than the first threshold, changing the local PN code, and repeating steps (a) through (c); else if the first result is determined to be equal to or greater than the first threshold, setting the first threshold equal to the first result; and (d) integrating the signal energy of the input signal over a second predetermined time interval to obtain a second result, wherein the second predetermined time interval has a duration that exceeds the first predetermined time interval;

(e) comparing the second result to a second threshold having a value that is a function of a previous second result; if the second result is determined to be less than the second threshold, changing the local PN code, and repeating steps (a) through (c); else if the second result is determined to be equal to or greater than the second threshold, setting the second threshold equal to the second result; and (f) if the end of the PN code space has not been reached, repeating steps (a) through (c).

2. A method as set forth in claim 1 wherein the first threshold is equal to $(1-y)$ of a previous first result having a largest magnitude, where y is between 1/16 and ⅛.

3. A method as set forth in claim 1 wherein the second threshold is equal to a previous second result having a largest magnitude.

4. A method of searching a pseudorandom noise (PN) code space, comprising the steps of:

(a) combining a received PN code signal with a first local PN code signal to obtain an input signal;

(b) integrating the signal energy of the input signal over a first predetermined time interval to obtain a first result;

(c) comparing the first result to a first threshold having a value that is a first function of a previous first result having a largest magnitude; if the first result is determined to less than the first threshold, (d) comparing the first result to a second threshold having a value that is a second function of the previous first result having the largest magnitude; if the first result is determined to be equal to or greater than the second threshold, initializing a counter value and, if the end of the PN code space has not been reached, changing the local PN code, and repeating steps (a) through (d); else if the first result is determined to less than the second threshold, incrementing the counter value, and comparing the counter value to a third threshold; if the counter value is determined to be greater than the third threshold, terminating the method, else if the counter value is determined to be less than the third threshold, changing the local PN code, and repeating steps (a) through (d);

if the first result is determined to be equal to or greater than the first threshold, comparing the first result to a fourth threshold having a value that is equal to the previous first result having the largest magnitude; if the first result is determined to be less than the fourth threshold, performing step (e), else if the first result is determined to be equal to or greater than the fourth threshold, setting the value of the previous first result having the largest magnitude to be equal to the current value of the first result; and (e) integrating the signal energy of the input signal over a second predetermined time interval to obtain a second result, wherein the second predetermined time interval has a duration that exceeds the first predetermined time interval;

(f) comparing the second result to a fifth threshold having a value that is a first function of a previous second result having a largest magnitude; if the second result is determined to less than the fifth threshold, (g) comparing the second result to a sixth threshold having a value that is a second function of the previous second result having a largest magnitude; if the second result is determined to be equal to or greater than the sixth threshold, initializing the counter value and, if the end of the PN code space has not been reached, changing the local PN code, and repeating steps (a) through (d); else if the second result is determined to be less than the sixth threshold, incrementing the counter value, and comparing the counter value to the third threshold; if the counter value is determined to be greater than the third threshold, terminating the method, else if the counter value is determined to be less than the third threshold, changing the local PN code, and repeating steps (a) through (d).

5. A method as set forth in claim 4 wherein the first threshold is equal to $(1-y)$, where y is between 1/16 and ⅛, of the previous first result having a largest magnitude, wherein the second threshold has a value that is within a range of approximately 3 dB to approximately 6 dB less than the previous first result having the largest magnitude, wherein the fifth threshold is equal to the previous second result having the largest magnitude, and wherein the sixth threshold has a value that is within a range of approximately 3 dB to approximately 6 dB less than the previous second result having the largest magnitude.

6. A method as set forth in claim 4 wherein the third threshold has a value within the range of approximately 70 to approximately 150.

7. A correlator for searching a pseudorandom noise (PN) code space, comprising:

means for multiplying a received PN code signal times a first local PN code signal to obtain an input signal;

first means for integrating the signal energy of the input signal over a first time interval to obtain a first result;

first means for comparing the first result to a first threshold value to determine if the integration of the signal energy is equal to or greater than the first threshold value;

second means for integrating the signal energy of the input signal over a second time interval to obtain a second result, wherein the second time interval is longer than the first time interval;

second means for comparing the second result to a second threshold value to determine if the integration of the signal energy is equal to or greater than the second threshold value;

means, responsive to the operation of said first comparing means, for adaptively setting the first threshold value to a value that is a function of a value of a maximum first result; and means, responsive to the operation of said second comparing means, for adaptively setting the second threshold value to a value that is a function of a value of a maximum second result.

8. A correlator as set forth in claim 7 wherein the first threshold is equal to $(1-y)$, where y is between 1/16 and ⅛, of a previous first result having a largest magnitude.

9. A correlator as set forth in claim 7 wherein the second threshold is equal to a previous second result having a largest magnitude.

10. A correlator for searching a pseudorandom noise (PN) code space, comprising:

means for multiplying a received PN code signal times a first local PN code signal to obtain an input signal;

first means for integrating the signal energy of the input signal over a first time interval to obtain a first result;

first means for comparing the first result to a first threshold value to determine if the integration of the signal energy is equal to or greater than the first threshold value;

second means for selectively comparing the first result to a second threshold value to determine if the integration of the signal energy is equal to or greater than the second threshold value, wherein the second threshold value is less than the first threshold value;

second means for integrating the signal energy of the input signal over a second time interval to obtain a second result, wherein the second time interval is longer than the first time interval;

third means for comparing the second result to a third threshold value to determine if the integration of the signal energy is equal to or greater than the third threshold value;

fourth means for selectively comparing the second result to a fourth threshold value to determine if the integration of the signal energy is equal to or greater than the fourth threshold value, wherein the fourth threshold value is less than the third threshold value;

means, responsive to the operation of said first and second comparing means, for adaptively setting the first threshold value and the second threshold value to a value that is a function of a value of a maximum first result; and means, responsive to the operation of said third and fourth comparing means, for adaptively setting the third threshold value and the fourth threshold value to a value that is a function of a value of a maximum second result.

11. A correlator as set forth in claim 10 wherein the first threshold is equal to $(1-y)$, where y is between 1/16 and ⅛, of a previous first result having a largest magnitude, wherein the second threshold has a value that is within a range of approximately 3 dB to approximately 6 dB less than the previous first result having the largest magnitude, wherein the third threshold is equal to the previous second result having the largest magnitude, and wherein the fourth threshold has a value that is within a range of approximately 3 dB to approximately 6 dB less than the previous second result having the largest magnitude.

12. A correlator as set forth in claim 10 and further comprising means for operating said correlator to process a predetermined number of additional input signals after an input signal having a largest signal energy is detected.

13. A correlator as set forth in claim 12 wherein said operating means is responsive to said second comparing means indicating that the first result of each of the additional input signals is less than the second threshold and to said fourth comparing means indicating that the second result is less than the fourth threshold.

14. A correlator as set forth in claim 12 wherein the predetermined number is within a range of approximately 70 to approximately 150.

* * * * *